United States Patent
Sawaki et al.

(10) Patent No.: US 7,829,061 B2
(45) Date of Patent: Nov. 9, 2010

(54) ZIRCONIUM OXIDE HYDRATE PARTICLES AND METHOD FOR PRODUCING THE SAME

(75) Inventors: Yuko Sawaki, Osaka (JP); Kazutaka Matsuo, Osaka (JP); Mikio Kishimoto, Osaka (JP); Takayuki Hirashige, Tokyo (JP); Makoto Morishima, Tokyo (JP)

(73) Assignees: Hitachi Maxwell, Ltd., Ibaraki-shi, Osaka (JP); Hitachi, Ltd., Tokyo (JP)

( * ) Notice: Subject to any disclaimer, the term of this patent is extended or adjusted under 35 U.S.C. 154(b) by 147 days.

(21) Appl. No.: 12/167,110

(22) Filed: Jul. 2, 2008

(65) Prior Publication Data

US 2009/0011239 A1    Jan. 8, 2009

(30) Foreign Application Priority Data

Jul. 6, 2007    (JP)    ............... 2007-178603

(51) Int. Cl.
    *C01G 25/02*    (2006.01)
(52) U.S. Cl. .................. 423/608; 423/594.12
(58) Field of Classification Search .......... 423/608, 423/594.12
    See application file for complete search history.

(56) References Cited

U.S. PATENT DOCUMENTS 4,362,626 A * 12/1982 Takeuchi et al. ............ 210/670

2002/0009628 A1    1/2002 Hara et al.
2006/0245999 A1 * 11/2006 Shen et al. .................. 423/608
2007/0163890 A1 * 7/2007 Schussler .................... 205/687

FOREIGN PATENT DOCUMENTS

| JP | 2000-19152 A | 1/2000 |
| JP | 2002-83611 A | 3/2002 |
| JP | 2004-325388 A | 11/2004 |
| JP | 2005-170700 A | 6/2005 |
| JP | 2006-143535 A | 6/2006 |

* cited by examiner

*Primary Examiner*—Timothy C Vanoy
*Assistant Examiner*—Michelle Hou
(74) *Attorney, Agent, or Firm*—Birch, Stewart, Kolasch & Birch, LLP

(57) ABSTRACT

The zirconium oxide hydrate particles of the present invention are represented by the formula $ZrO_2 \cdot nH_2O$ and have a mean primary particle size of 0.5 nm or more and 5 nm or less, and "n" in the formula represents a number greater than 2.5. Moreover, the method for producing of zirconium oxide hydrate particles of the present invention includes the step of preparing zirconium oxide hydrate particles by adding an aqueous zirconium salt solution to an aqueous alkaline solution while controlling the pH to 7.0 or more and 13.0 or less, and the step of subjecting the zirconium oxide hydrate particles to a hydrothermal treatment in the presence of water at a temperature of 50° C. or more and less than 110° C. for 3 hours or more.

4 Claims, 3 Drawing Sheets

ZIRCONIUM OXIDE HYDRATE PARTICLES AND METHOD FOR PRODUCING THE SAME

BACKGROUND OF THE INVENTION

1. Field of the Invention

The present invention relates to zirconium oxide hydrate particles that contain a large amount of water of hydration and exhibit high proton conductivity, and to a production method therefor.

2. Description of Related Art

Aluminum oxide, doped cerium oxide, zirconium oxide, various composite oxides and like inorganic materials are inorganic proton-conductive materials, and are applicable to a variety of uses in, for example, solid acid catalysts, electrolyte materials for use in electrochemical capacitors, fuel cells and the like, various gas sensors such as hydrogen sensors, oxygen sensors and the like, etc. Among such inorganic proton-conductive materials, zirconium oxide is superior in terms of ease, safety and like characteristics in the production process thereof, and is a material used highly frequently.

As an application of zirconium oxide and the like, for example, JP 2004-325388A proposes a gas sensor containing a gas sensitive material composed of a solid super strong acid substance containing titanium oxide, zirconium oxide, tin oxide or the like. Moreover, JP 2000-19152A discloses that stabilized zirconia or stabilized ceria is effective as an ion-conductive electrolyte for hydrogen gas sensors. Furthermore, JP 2002-83611A proposes a solid electrolyte fuel cell containing a solid electrolyte layer composed of stabilized zirconia or a ceria-based oxide.

Such zirconium oxide is present also as a hydrate. Production methods therefor that are generally employed include a method using a neutralization reaction between an alkali solution and a zirconium salt solution and a method using a hydrolysis reaction of a zirconium salt by ammonia. The amount of water of hydration (n) of the zirconium oxide hydrate represented by the formula $ZrO_2 \cdot nH_2O$ produced according to these methods is only about 2.5 when in a dried state at room temperature. Here, the water of hydration of the zirconium oxide hydrate includes both the water of adsorption that is adsorbed on the surface of zirconium oxide hydrate particles and the water of crystallization present in the crystal of zirconium oxide hydrate particles.

In addition, as a method for producing fine zirconium oxide particles, JP 2006-143535A proposes a method for producing a zirconia sol in which fine zirconia particles have a mean particle size within the range of 5 to 100 nm according to the neutralization-precipitation method. Moreover, JP 2005-170700A proposes also a method for producing zirconium oxide particles having a mean particle diameter or a mean particle major-axis length of 1 to 200 nm according to the neutralization-precipitation method.

It is known that, generally, the larger the amount of water of hydration a zirconium oxide hydrate has, the higher the proton conductivity thereof. A zirconium oxide hydrate having a large amount of water of hydration ideally (1) is of ultrafine particles so as to have a large amount of water of adsorption with an increased specific surface area, and further (2) needs to have low crystallinity so as to contain large amounts of both water of crystallization and water of adsorption. Thereby, the amount of water of hydration as a whole obtained as the total sum of water of adsorption and water of crystallization can be as large as possible. Thus, to obtain a zirconium oxide hydrate having high proton conductivity, the particle size of the zirconium oxide hydrate should be as small as possible and the crystallinity thereof should be as low as possible.

However, in order to make the particle size of a zirconium oxide hydrate small, uniform fine particles having high dispersibility need to be obtained by increasing the crystallinity. However, increasing crystallinity creates a problem in that the amounts of water of adsorption and water of crystallization are both, decreased. On the other hand, when the crystallinity of a zirconium oxide hydrate is lowered, zirconium oxide hydrate particles have a strong tendency to adhere to each other with a small amount of heat regardless of whether in a wet atmosphere or a dry atmosphere and form coarse particles, thereby making it difficult to obtain uniform fine particles. As a result, although the amount of water of adsorption and the amount of water of crystallisation are increased to some extent due to the decrease in crystallinity, the specific surface area is decreased due to the increase in particle size, thereby imposing a limit also to the increase of the amount of water of adsorption.

Thus, it has been difficult to obtain zirconium oxide hydrate particles having a large amount of water of hydration that have low crystallinity and are of ultrafine particles.

SUMMARY OF THE INVENTION

The present invention addresses the above-described problems and provides zirconium oxide hydrate particles having a large amount of water of hydration and high proton conductivity.

A feature of the zirconium oxide hydrate particles of the present invention is that the zirconium oxide hydrate particles are represented by the formula $ZrO_2 \cdot nH_2O$, the mean primary particle size of the particles is 0.5 nm or more and 5 nm or less, and "n" in the formula represents a number greater than 2.5 and is a value measured after the particles are dispersed in water, filtered and then dried in air at 60° C. for 6 hours.

A feature of the method for producing zirconium oxide hydrate particles of the present invention is the inclusion of the steps of preparing zirconium oxide hydrate particles by adding an aqueous zirconium salt solution to an aqueous alkaline solution while controlling the pH to 7.0 or more and 13.0 or less, and subjecting the zirconium oxide hydrate particles to a hydrothermal treatment in the presence of water at a temperature of 50° C. or more and less than 110° C. for 3 hours or more.

According to the present invention, a zirconium oxide hydrate having a large amount of water of hydration and high proton conductivity can be provided.

DESCRIPTION OF THE PREFERRED EMBODIMENTS

Embodiment 1

Figure 1:
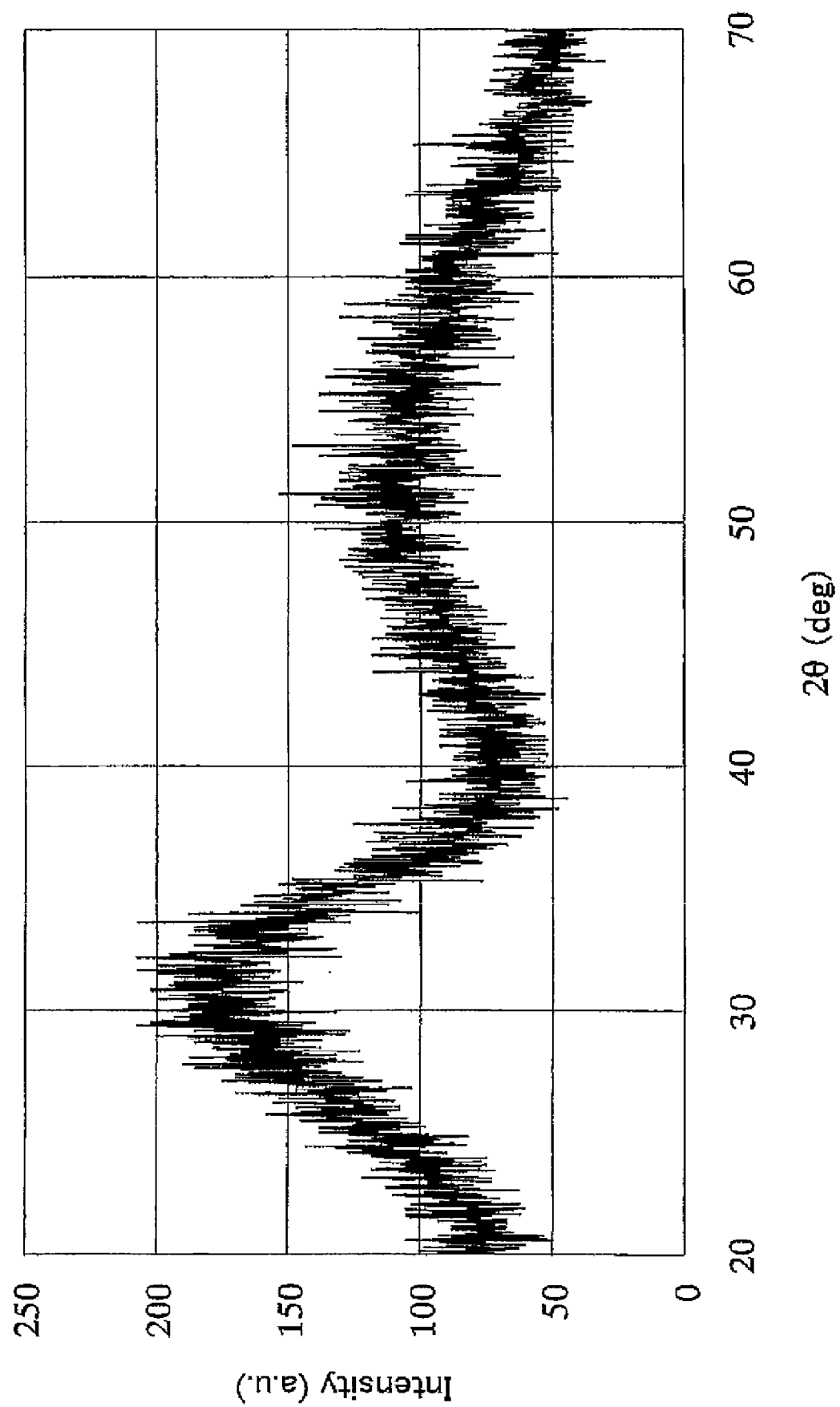
FIG. 1 is a diagram showing an X-ray diffraction spectrum of the zirconium oxide hydrate particles obtained in Example 1.

First, the zirconium oxide hydrate particles of the present invention shall be described. A feature of the zirconium oxide hydrate particles of the present invention is that the zirconium oxide hydrate particles are represented by the formula $ZrO_2 \cdot nH_2O$, the mean primary particle size of the particles is 0.5 nm or more and 5 nm or less, and "n" in the formula represents a number greater than 2.5 and is a value measured after the particles are dispersed in water, filtered and then dried in air at 60° C. for 6 hours.

The mean primary particle size is 0.5 nm or more and 5 nm or less, and preferably 1 nm or more and 3.5 nm or less. When the mean primary particle size exceeds 5 nm, the specific surface area of the particles is decreased and the amount of water of adsorption is decreased, resulting in a decreased total amount of water of hydration. Since the lattice constant of zirconium oxide is about 0.5 nm, it is difficult to produce the aforementioned zirconium oxide hydrate particles having a mean primary particle size of less than 0.5 nm. In particular, the mean primary particle size of 1 nm or more and 3.5 nm or lees is the lower limit of the particle size range with which the boundary of the fine particles is clear and thus particle properties are enhanced, thereby further increasing the amount of water of adsorption at the surface. Therefore, such a particle size is preferable.

It is sufficient that the zirconium oxide hydrate particles have a mean particle size of the primary particles within the aforementioned range even when the primary particles form secondary particles by agglomeration. This is because the amount of water of hydration of the zirconium oxide hydrate particles is not adversely affected even when primary particles form secondary particles by agglomeration.

With respect to the present invention, the mean particle size is calculated from the arithmetic mean of the length of the diameter or the major axis of 300 particles observed in a picture taken by a transmission electron microscope (TEM).

In the formula given above, "n" that represents the amount of water of hydration of the zirconium oxide hydrate particles is a value exceeding 2.5, and is preferably 4 or more. Thereby, zirconium oxide hydrate particles having high proton conductivity can be provided compared with conventional zirconium oxide hydrate particles having an amount of water of hydration of 2.5 or less. In particular, when "n" is 4 or more, the zirconium oxide hydrate particles are best suitable as a proton-conductive electrolyte material for use in fuel cells or the like. The upper limit of "n" is not particularly limited. With respect to the zirconium oxide hydrate particles produced according to the method for producing zirconium oxide hydrate particles of the present invention that shall be described below, the upper limit of "n" is about 10.

With respect to the present invention, "n" is a value measured by a simultaneous thermogravimetric/differential thermal analysis (TG/DTA) after the zirconium oxide hydrate particles are dispersed in water, filtered and then dried in air at 60° C. for 6 hours. This is to provide a clear standard for comparing with each other the water of crystallization and the water of adsorption of the zirconium oxide hydrate particles both of which are combined to form the amount of water of hydration as a whole since the amount of water of hydration of the zirconium oxide hydrate particles, in particular the amount of water of adsorption, is changed depending on the drying conditions. In the simultaneous thermogravimetric/differential thermal analysis, the change of the amount of water of hydration, including water of adsorption and water of crystallization, in the zirconium oxide hydrate is continuous, and when all the water of hydration is removed, a discontinuous crystal structure change takes place, resulting in an observation of an exothermic peak in the range of about 400 to about 500° C. The amount of water of hydration in the present invention is calculated based on the change of the amount of water up to the point where this exothermic peak is observed in the simultaneous thermogravimetric/differential thermal analysis.

Embodiment 2

Next, the method for producing zirconium oxide hydrate particles of the present invention shall be described. A feature of the method for producing zirconium oxide hydrate particles of the present invention is the inclusion of the steps of preparing zirconium oxide hydrate particles by adding an aqueous zirconium salt solution to an aqueous alkaline solution while controlling the pH to 7.0 or more and 13.0 or less, and subjecting the zirconium oxide hydrate particles to a hydrothermal treatment in the presence of water at a temperature of 50° C. or more and less than 110° C. for 3 hours or more.

According to the production method described above, ultrafine particles of a zirconium oxide hydrate having a mean primary particle size of 5 nm or less and a large amount of water of hydration that has been considered as being difficult to produce can be obtained. That is, the zirconium oxide hydrate particles produced according to the production method described above have a uniform particle size distribution and do not contain coarse particles despite relatively low crystallinity, and therefore, zirconium oxide hydrate particles having a large amount of water of hydration and high proton conductivity as described in Embodiment 1 can be obtained advantageously.

It is preferable that the method for producing zirconium oxide hydrate particles of the present invention further includes the step of aging the aqueous solution used in preparing the zirconium oxide hydrate particles at a pH of 7.0 or more and 13.0 or less at a temperature of 20° C. or more and 90° C. or less for 5 hours or more and 40 hours or less that is carried out prior to the step of a hydrothermal treatment. Thereby, the amount of water of hydration can be further increased.

In addition, the method for producing zirconium oxide hydrate particles of the present invention can further include the step of drying the zirconium oxide hydrate particles that have been subjected to a hydrothermal treatment in air at a temperature of 20° C. or more and 90° C. or less for 3 hours or more and 12 hours or less. Thereby, powdery zirconium oxide hydrate particles can be obtained. However, when the zirconium oxide hydrate particles are used in the state of being dispersed in water, the above-described drying step is not necessarily needed.

Below, an example of the method for producing zirconium oxide hydrate particles of the present invention shall be described in more detail.

<Solution Preparation Step>

First, a zirconium salt is dissolved in water to prepare an aqueous zirconium salt solution. Zirconium chloride, zirconium oxychloride, zirconium nitrate, zirconium sulfate, etc., can be used as zirconium salts. Zirconium oxychloride is most preferable to obtain zirconium oxide hydrate particles having a large amount of water of hydration.

The zirconium salt content in the aqueous zirconium salt solution is not particularly limited, and it is usually 0.05 to 0.5 mol/L.

Next, an aqueous alkaline solution is prepared. Aqueous solutions of alkali metal salts such as sodium hydroxide, potassium hydroxide, lithium hydroxide and the like and an aqueous ammonia solution can be used as aqueous alkaline solutions. An aqueous ammonia solution is most preferable to obtain fine zirconium oxide hydrate particles.

<Precipitation Step>

Next, the aqueous zirconium salt solution is added dropwise to the aqueous alkaline solution and the mixture is stirred. The pH is controlled to 7.0 or more and 13.0 or less, and preferably 9.5 or more and 12.0 or less, and zirconium oxide hydrate particles are precipitated. When the pH is outside the range mentioned above, the amount of water of hydration of the zirconium oxide hydrate particles are decreased, and thus such pH is not preferable. Moreover, as an operational procedure, when the aqueous alkaline solution is added dropwise to the aqueous zirconium salt solution, since the aqueous zirconium salt solution is acidic, it is difficult to control the pH to 7.0 or more and 13.0 or less, and thus such a procedure is not preferable.

<Aging Step>

Next, the aqueous solution in which zirconium oxide hydrate particles are precipitated is aged at a pH of 7.0 or more and 13.0 or less, and preferably 9.5 or more to 12.0 or less at a temperature of 20° C. or more and 90° C. or less, and preferably 20° C. or more and 30° C. or less for 5 hours or more and 40 hours or less. Although the aging step is not essential in the method for producing of zirconium oxide hydrate particles of the present invention, the aging step can further enhance the amount of water of hydration of zirconium oxide hydrate particles.

When the pH of the aqueous solution in which zirconium oxide hydrate particles are precipitated is less than 7.0, zirconium oxide hydrate particles are not sufficiently precipitated, and when the pH exceeds 13.0, crystals excessively grow in the following hydrothermal treatment step, forming zirconium oxide hydrate particles of relatively high crystallinity. Therefore, water of adsorption and water of crystallization are both decreased, resulting in a decreased amount of water of hydration. Moreover, when the aging temperature is lower than 20° C., the effect of aging is not sufficiently obtained, and when the aging temperature exceeds 90° C., the particle size of the zirconium oxide hydrate particles is increased and thus the specific surface area is decreased. Therefore, the water of adsorption is decreased, resulting in a decreased amount of water of hydration. Furthermore, the aging time of less than 5 hours is not preferable because the uniformity of the particle size of the zirconium oxide hydrate particles is not sufficient, and the aging time exceeding 40 hours is not preferable because crystals excessively grow in the solution, making it difficult to obtain zirconium oxide hydrate particles having a large amount of water of hydration <Hydrothermal Treatment Step>

Next, the zirconium oxide hydrate particles are subjected to a hydrothermal treatment in the presence of water at a temperature of 50° C. or more and lower than 110° C., and preferably 60° C. or more and 105° C. or less, for 3 hours or more and 6 hours or less, and preferably 3 hours or more and 4 hours or less. The hydrothermal treatment is carried out by heating at the aforementioned temperatures in an airtight container such as an autoclave or the like.

When the hydrothermal treatment temperature is lower than 50° C., the zirconium oxide hydrate often does not take a particle form. As a result, coarsening occurs due to adhesion, making it difficult to obtain zirconium oxide hydrate particles having a mean primary particle size of 5 nm or less. In addition, the hydrothermal treatment temperature exceeding 110° C. is not preferable because zirconium oxide particles of high crystallinity are formed, resulting in zirconium oxide particles containing very little water of crystallization. When the hydrothermal treatment time is less than 3 hours, the amount of water of hydration of the zirconium oxide hydrate particles is not sufficiently large. On the other hand, when the hydrothermal treatment time is more than 6 hours, the amount of water of hydration reaches saturation and the hydrothermal treatment continued thereafter does not further increase the amount of water of hydration.

<Drying Step>

Next, the zirconium oxide hydrate particles subjected to the hydrothermal treatment are washed with water to give a zirconium oxide hydrate particle dispersion having a pH of about 6 to about 9, the dispersion is subjected to filtration, and the filtered substance is then dried in air at a temperature of 20° C. or more and 90° C. or less for 3 hours or more and 12 hours or less. Although it is preferable to remove impurities as much as possible by water-washing as described above, water-washing can be omitted. Although the drying step is not essential in the method for producing zirconium oxide hydrate particles of the present invention, the drying step enables powdery zirconium oxide hydrate particles to be obtained.

The drying temperatures and drying times given above are merely examples, and they may be outside the aforementioned ranges. However, when the drying temperature exceeds 90° C., the crystal structure itself of zirconium oxide is changed and there is a small possibility of a loss of water of crystallisation, and therefore the drying temperature is preferably 90° C. or less. Furthermore, drying atmosphere is not particularly limited, and it is preferable to carry out drying in air because it is most convenient.

The zirconium oxide hydrate particles thus obtained have a mean primary particle size in the range of 0.5 nm or more and 5 nm or lees and an amount of water of hydration (n) of the zirconium oxide hydrate particles represented by the formula $ZrO_2 \cdot nH_2O$ is 2.5 or more. When an X-ray diffraction spectrum of the obtained zirconium oxide hydrate particles is measured, although the zirconium oxide hydrate particles have a tetragonal structure of $ZrO_2$, the X-ray diffraction spectrum thereof is very broad, and a low crystallinity structure close to being amorphous can be identified.

The amount of water of hydration (n) mentioned above is expressed as a value measured after dispersing the zirconium oxide hydrate particles in water, filtering the particles and then drying the particles in air at 60° C. for 6 hours, and represents the total sum of the amount of water of crystallization and the amount of water of adsorption.

Here, since the water of adsorption is water which is adsorbed on the particle surface, it is common that the amount thereof is changed depending on the drying conditions and other factors. Therefore, the measurement of water of adsorption refers to a measurement of the amount of water that can be adsorbed. In ordinary crystalline particles, when crystallinity is completely identical, the larger the specific surface area, generally the larger the amount of water of adsorption, but when there is even a slight difference in crystallinity, since surface characteristics are different accordingly, the amount of adsorbable water cannot be measured based on the specific surface area of a type of substances whose structures change continuously, such as the zirconium oxide hydrate particles of the present invention. Moreover, although it is possible to evaluate only the water of crystallization after completely removing the water of adsorption, since both water of crystallization and water of adsorption are involved in the proton conductivity of zirconium oxide, it is necessary to know not just either the water of crystallization or the water of adsorption but the amount of water as a whole. Therefore, the standard for the measurement of the aforementioned amount of water of hydration (n) has been defined.

Below, the present invention shall be described using examples. The present invention, however, is not limited to the examples given below.

EXAMPLE 1

An aqueous ammonia solution used in this example was prepared by mixing 15.12 g of a 28% aqueous ammonia solution with 300 mL of water. Separately from this aqueous ammonia solution, an aqueous zirconium salt solution was prepared by dissolving 8 g of zirconium oxychloride octahydrate in 100 mL of water (solution preparation step).

Next, the aqueous ammonia solution was stirred while the aqueous zirconium salt solution was added dropwise thereto, thereby generating a precipitate containing zirconium oxide hydrate particles (precipitation step). The aqueous zirconium Bait solution was completely used in this dropwise addition. The pH of the suspension containing this precipitate was 11.8. This precipitate was aged at 25° C. for 15 hours in the state of a suspension (aging process). The pH of the suspension after 15 hours was 11.3.

Then, the suspension containing this precipitate was introduced into an autoclave and subjected to a hydrothermal treatment at 100° C. for 4 hours (hydrothermal treatment step).

Finally, after water washing was carried out using an ultrasonic cleaner to remove unreacted ingredients and impurities from the precipitate after the hydrothermal treatment, filtration was carried out, and then drying was carried out at 60° C. for 6 hours in air according to the standard for the measurement of the amount of hydration described above (drying step). Then, the resultant was lightly crushed using a mortar, and zirconium oxide hydrate particles were obtained.

<Measurement of X-Ray Diffraction Spectrum>

The X-ray diffraction spectrum of the obtained zirconium oxide hydrate particles was measured. FIG. 1 shows the X-ray diffraction spectrum of the zirconium oxide hydrate particles. According to FIG. 1, although very broad, two peak strengths created by spectral peak overlap that are characteristic of tetragonal zirconium oxide were observed near 30 deg and 50 deg.

<Measurement of Mean Primary Particle Size>

Figure 2:
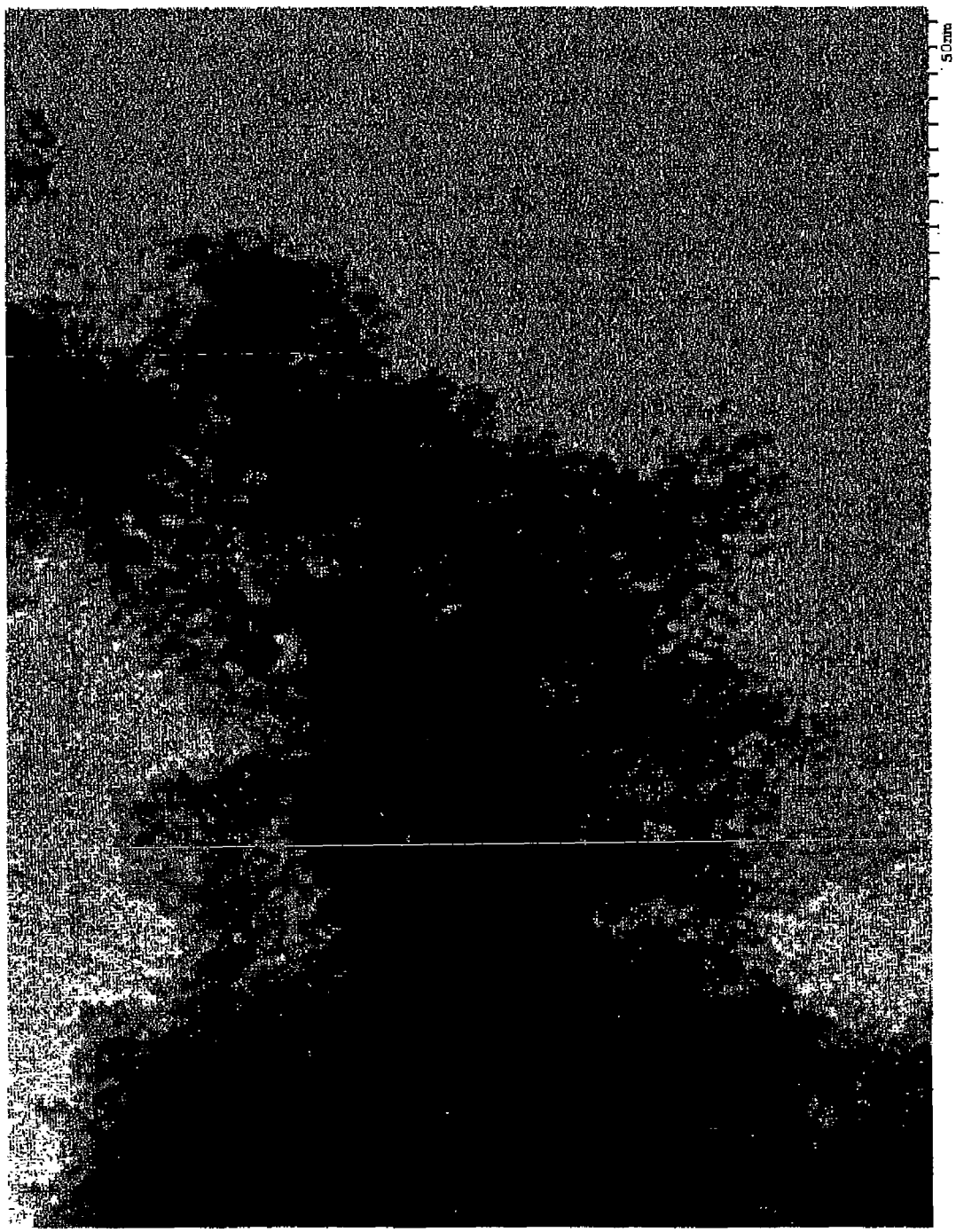
FIG. 2 is a transmission electron micrograph of the zirconium oxide hydrate particles obtained in Example 1.

The shape of the obtained zirconium oxide hydrate particles was observed using a transmission electron microscope (TEM), revealing that the particles had a particle size of about 2 to about 4 nm. In addition, no secondary particles due to agglomeration were observed, FIG. 2 shows a TEM micrograph of the zirconium oxide hydrate particles taken at 800000-fold magnification. Using this TEM micrograph, the arithmetic mean of the length of the diameter or major axis of 300 zirconium oxide hydrate particles was calculated, and the mean primary particle size of the zirconium oxide hydrate particles was found to be 3.2 nm.

<Measurement of Amount of Water of Hydration>

With respect to the zirconium oxide hydrate particles 1 hour after drying, a simultaneous thermogravimetric/differential thermal analysis (TG/DTA) was carried out using a differential thermal balance (device model number: TG-DTA-2000S) manufactured by Rigaku Corporation, and the amount of water of hydration (n) of the zirconium oxide hydrate particles represented by the formula $ZrO_2 \cdot nH_2O$ was found to be 5.59.

EXAMPLE 2

Zirconium oxide hydrate particles were produced in the same manner as in Example 1 except that in the hydrothermal treatment step for zirconium oxide hydrate particles, the hydrothermal treatment temperature was 80° C., although it was 100° C. in Example 1.

With respect to the obtained zirconium oxide hydrate particles, an X-ray diffraction spectrum was measured, and a very broad spectrum that resulting from tetragonal zirconium oxide was observed as in Example 1. In addition, a shape observation using a transmission electron microscope was carried out, revealing particles having a particle size of about 1 to about 2 nm. The mean primary particle size of the zirconium oxide hydrate particles calculated in the same manner as in Example 1 was 1.4 nm. Furthermore, the amount of water of hydration (n) obtained in the same manner as in Example 1 was 4.26.

EXAMPLE 3

Zirconium oxide hydrate particles were produced in the same manner as in Example 1 except that in the preparation step for zirconium oxide hydrate particles, the aging step was not performed and the hydrothermal treatment temperature was 90° C. although it was 100° C. in Example 1.

With respect to the obtained zirconium oxide hydrate particles, an X-ray diffraction spectrum was measured, and a very broad spectrum that corresponds to tetragonal zirconium oxide was observed as in Example 1. In addition, a shape observation using a transmission electron microscope was carried out, revealing particles having a particle size of about 1 to about 3 nm. The mean primary particle size of the zirconium oxide hydrate particles calculated in the same manner as in Example 1 was 2.1 nm. Furthermore, the amount of water of hydration (n) obtained in the same manner as in Example 1 was 3.22.

EXAMPLE 4

Zirconium oxide hydrate particles were produced in the same manner as in Example 1 except that in the aging step for zirconium oxide hydrate particles, the aging temperature was 95° C. although it was 25° C. in Example 1.

With respect to the obtained zirconium oxide hydrate particles, an X-ray diffraction spectrum was measured, and a very broad spectrum that corresponds to tetragonal zirconium oxide was observed as in Example 1. In addition, a shape observation using a transmission electron microscope was carried out, revealing particles having a particle size of about 4 to about 5 nm. The mean primary particle size of the zirconium oxide hydrate particles calculated in the same manner as in Example 1 was 4.3 nm. Furthermore, the amount of water of hydration (n) obtained in the same manner as in Example 1 was 2.83.

COMPARATIVE EXAMPLE 1

Zirconium oxide hydrate particles were produced in the same manner as in Example 1 except that in the hydrothermal treatment step for zirconium oxide hydrate particles, the hydrothermal treatment temperature was 180° C. although it was 100° C. in Example 1.

Figure 3:
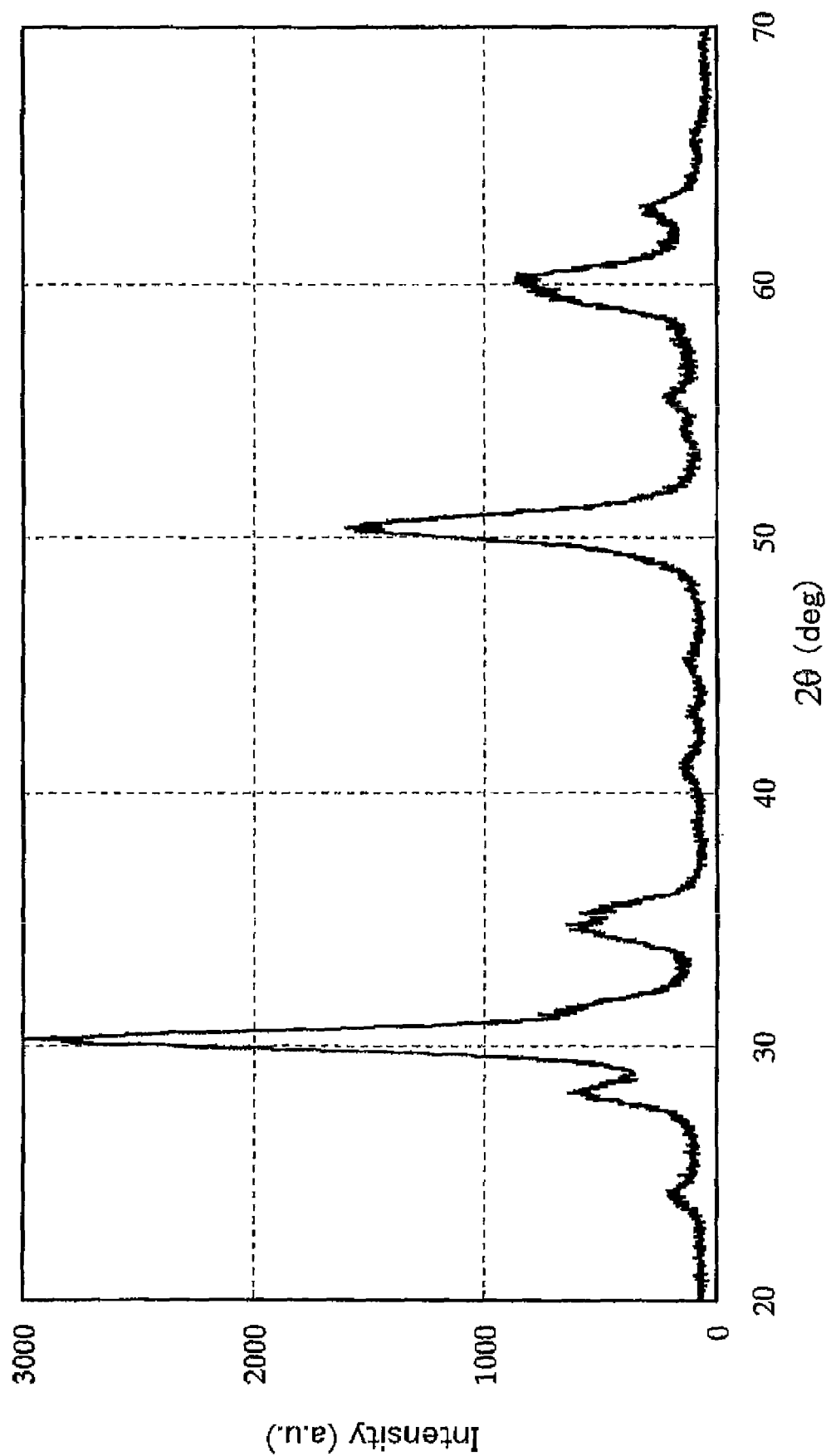
FIG. 3 is a diagram showing an X-ray diffraction spectrum of the zirconium oxide hydrate particles obtained in Comparative Example 1.

With respect to the obtained zirconium oxide hydrate particles, an X-ray diffraction spectrum was measured. FIG. 3 shows the X-ray diffraction spectrum of the zirconium oxide hydrate particles. According to FIG. 3, clear spectral peaks were observed near 30 deg and 50 deg that are characteristic of tetragonal zirconium oxide, and also spectral peaks were observed near 25, 28 and 32 deg that are characteristic of monoclinic zirconium oxide, thereby revealing that the zirconium, oxide hydrate particles obtained in this comparative example were composed of tetragonal and monoclinic mixed crystals. In addition, a shape observation using a transmission electron microscope was carried out, revealing particles having a particle size of about 5 to about 10 nm. The mean primary particle size of the zirconium oxide hydrate particles calculated in the same manner as in Example 1 was 8.1 nm. Furthermore, the amount of water of hydration (n) obtained in the same manner as in Example 1 was 0.11.

COMPARATIVE EXAMPLE 2

Zirconium oxide hydrate particles were produced in the same manner as in Example 1 except that in the hydrothermal treatment step for zirconium oxide hydrate particles, the hydrothermal treatment temperature was 120° C. although it was 100° C. in Example 1.

With respect to the obtained zirconium oxide hydrate particles, an X-ray diffraction spectrum was measured, and a spectrum, although broad, that has a peak with a rather narrow width and that corresponds to tetragonal zirconium oxide was observed. In addition, a shape observation using a transmission electron microscope was carried out, revealing particles having a particle size of about 4 to about 5 nm. The mean primary particle size of the zirconium oxide hydrate particles calculated in the same manner as in Example 1 was 4.7 nm. Furthermore, the amount of water of hydration (n) found in the same manner as in Example 1 was 2.48.

COMPARATIVE EXAMPLE 3

Zirconium oxide hydrate particles were produced in the same manner as in Example 1 except that in the preparation step for zirconium oxide hydrate particles, the hydrothermal treatment step was not performed unlike in Example 1. With respect to the obtained zirconium oxide hydrate particles, an X-ray diffraction spectrum was measured, and a very broad spectrum that corresponds to tetragonal zirconium oxide was observed as in Example 1. In addition, a shape observation using a transmission electron microscope was carried out, revealing particles of various sizes having a broad particle size distribution, i.e., a particle size of about 500 nm (0.5 p) to about 1 μm. Therefore, a mean primary particle size was not calculated in this comparative example. Furthermore, the amount of water of hydration (n) found in the same manner as in Example 1 was 2.42.

COMPARATIVE EXAMPLE 4

Zirconium oxide hydrate particles were produced in the same manner as in Example 1 except that in the precipitation step for zirconium oxide hydrate particles, an aqueous sodium hydroxide in which 10 g of sodium hydroxide had been dissolved in 300 mL of water was used in place of the aqueous ammonia solution used in Example 1. In this comparative example, the pH of the precipitate-containing suspension thus generated was 13.7, and the pH of the suspension after the aging step was 13.5.

With respect to the obtained zirconium oxide hydrate particles, an X-ray diffraction spectrum was measured, and a spectrum that corresponds to zirconium oxide composed of tetragonal and monoclinic mixed crystals was observed as in Comparative Example 1. In addition, a shape observation using a transmission electron microscope was carried out, revealing particles having a particle size of about 5 nm. The mean primary particle size of the zirconium oxide hydrate particles calculated in the same manner as in Example 1 was 5.4 nm. Furthermore, the amount of water of hydration (n) obtained in the same manner as in Example 1 was 0.87.

COMPARATIVE EXAMPLE 5

Zirconium oxide hydrate particles were produced in the same manner as in Example 1 except that in the precipitation step for zirconium oxide hydrate particles, an aqueous ammonia solution was added dropwise to an aqueous zirconium salt solution and vigorously stirred, thereby generating a precipitate containing zirconium oxide hydrate particles. In this comparative example, the pH of the precipitate-containing suspension thus generated was 11.7, and the pH of the suspension after aging was 11.5.

With respect to the obtained zirconium oxide hydrate particles, an X-ray diffraction spectrum was measured, and a very broad spectrum that corresponds to tetragonal zirconium oxide was observed as in Example 1. In addition, a shape observation using a transmission electron microscope was carried out, revealing particles having a particle size of about 2 to about 8 nm. The mean primary particle size of the zirconium oxide hydrate particles calculated in the same manner as in Example 1 was 5.5 nm. Furthermore, the amount of water of hydration (n) obtained in the same manner as in Example 1 was 1.45.

COMPARATIVE EXAMPLE 6

Zirconium oxide hydrate particles were produced in the same manner as in Example 1 except that in the drying step for zirconium oxide hydrate particles, the drying temperature was 120° C. although it was 60° C. in Example 1.

With respect to the obtained zirconium oxide hydrate particles, an X-ray diffraction spectrum was measured, and a clear spectrum that corresponds to tetragonal zirconium oxide was observed. In addition, a shape observation using a transmission electron microscope was carried out, revealing particles having a particle size of about 3 nm. The mean primary particle size of the zirconium oxide hydrate particles calculated in the same manner as in Example 1 was 2.8 nm.

Furthermore, the obtained zirconium oxide hydrate particles were dispersed in water again, subjected to filtration and then dried at 60° C. for 6 hours in air according to the standard for the measurement of the amount of water of hydration described above. The amount of water of hydration (n) obtained in the same manner as in Example 1 was 1.96.

The results of the measurements described above are presented in Table 1 together with hydrothermal temperatures and drying conditions, provided that the space for the mean primary particle size of Comparative Example 3 shows the upper limit and lower limit of particle size.

TABLE 1

|  | Hydrothermal temperature (° C.) | Drying conditions | Crystal structure | Mean primary particle size | Amount of water of hydration (n) |
| --- | --- | --- | --- | --- | --- |
| Example 1 | 100 | 60° C./6 h | Broad, tetragonal | 3.2 nm | 5.59 |
| Example 2 | 80 | 60° C./6 h | Broad, tetragonal | 1.4 nm | 4.26 |
| Example 3 | 90 | 60° C./6 h | Broad, tetragonal | 2.1 nm | 3.22 |

TABLE 1-continued

| | Hydrothermal temperature (° C.) | Drying conditions | Crystal structure | Mean primary particle size | Amount of water of hydration (n) |
|---|---|---|---|---|---|
| Example 4 | 100 | 60° C./6 h | Broad, tetragonal | 4.3 nm | 2.83 |
| Comparative Example 1 | 180 | 60° C./6 h | Tetragonal + monoclinic | 8.1 nm | 0.11 |
| Comparative Example 2 | 120 | 60° C./6 h | Broad, tetagonal | 4.7 nm | 2.48 |
| Comparative Example 3 | — | 60° C./6 h | Broad, tetragonal | 0.5-1 μm | 2.42 |
| Comparative Example 4 | 100 | 60° C./6 h | Tetragonal + monoclinic | 5.4 nm | 0.87 |
| Comparative Example 5 | 100 | 60° C./6 h | Broad, tetragonal | 5.6 nm | 1.45 |
| Comparative Example 6 | 100 | 120° C./6 h | Tetragonal | 2.8 nm | 1.96 |

As is clear from Table 1, it can be understood that the zirconium oxide hydrate particles obtained in Examples 1 to 4 are ultrafine particles of a zirconium oxide hydrate having a particle size of 5 nm or less that have been considered difficult to be produced, and the zirconium oxide hydrate particles have large amounts of water of hydration. Therefore, the zirconium oxide hydrate particles of the present invention can be used highly effectively in various materials with which high proton conductivity is required.

On the other hand, it can be understood that although highly crystalline zirconium oxide particles were obtained in Comparative Example 1, those zirconium oxide particles barely contained water of hydration. Fine particles were obtained in Comparative Example 2, but the crystallinity was slightly increased because the hydrothermal temperature was slightly high at 120° C., resulting in an amount of water of hydration (n) of less than 2.5. Although the production method of Comparative Example 3 is a conventional method for producing zirconium oxide hydrate particles that is used most commonly and can realize a relatively large amount of water of hydration, the water of hydration reached only about 2.4. This may be attributed to fact that coarse particles grew due to the adhesion of particles, forming zirconium oxide hydrate particles of submicron size, and thus the amount of water of adsorption was decreased. An aqueous solution of sodium hydroxide, which is a strong base, was used as the aqueous alkaline solution in Comparative Example 4. The amount of water of hydration was decreased. This may be attributed to the fact that crystal growth was fast and the pH easily became overly high due to the excessive basicity resulting in increased crystallinity. The amount of water of hydration was decreased in Comparative Example 5, because an aqueous ammonia solution was added dropwise to an aqueous zirconium salt solution. In Comparative Example 6, although processing to supply water of adsorption was performed after drying at 120° C., the amount of water of hydration was decreased. This may be attributed to the fact that since the particles were dried once at 120° C. and then heated, the crystal structure was slightly changed and the amount of water of crystallization was decreased.

As described above, the zirconium oxide hydrate particles of the present invention have a large amount of water of hydration and high proton conductivity, and therefore are applicable to variety of use in, for example, solid acid catalysts, electrolyte materials for use in electrochemical capacitors, fuel cells and the like, electrochemical hydrogen pumps, various gas sensors such as hydrogen sensors, oxygen sensors and the like, etc.

The present invention may be embodied in other forms without departing from the spirit or essential characteristics thereof. The embodiments disclosed in this application are to be considered as illustrative and not restrictive. The scope of the present invention should be construed in view of the appended claims, rather than the foregoing description, and all changes that come within the meaning and range of equivalency of the claims are intended to be embraced therein.

What is claimed is:

1. Zirconium oxide hydrate particles represented by the formula $ZrO_2 \cdot nH_2O$,
   wherein the primary particles of the zirconium oxide hydrate particles have a mean primary particle size of 0.5 nm or more and 5 nm or less,
   the "n" in the formula represents a number of 4 or more, and
   the "n" is a value measured after the particles are dispersed in water, filtered and then dried in air at 60° C. for 6 hours.

2. The zirconium oxide hydrate particles according to claim 1, wherein the primary particles have a mean particle size of 1 nm or more and 3.5 nm or less.

3. A method for producing the zirconium oxide hydrate particles of claim 1, comprising the steps of:
   preparing zirconium oxide hydrate particles by adding an aqueous zirconium salt solution to an aqueous alkaline solution while controlling a pH to 7.0 or more and 13.0 or less,
   aging the aqueous solution in which the zirconium oxide hydrate particles are prepared at a pH of 7.0 or more and 13.0 or less at a temperature of 20° C. or more and 30° C. or less for 5 hours or more and 40 hours or less, and
   subjecting the zirconium oxide hydrate particles to a hydrothermal treatment in a sealed container in the presence of water at a temperature of 50° C. or more and lower than 110° C. for 3 hours or more.

4. The method for producing zirconium oxide hydrate particles according to claim 3, further comprising the step of drying the zirconium oxide hydrate particles subjected to a hydrothermal treatment in air at a temperature of 20° C. or more and 90° C. or less for 3 hours or more and 12 hours or less.

* * * * *

UNITED STATES PATENT AND TRADEMARK OFFICE
CERTIFICATE OF CORRECTION

PATENT NO. : 7,829,061 B2  
APPLICATION NO. : 12/167110  
DATED : November 9, 2010  
INVENTOR(S) : Yuko Sawaki et al.

Page 1 of 1

It is certified that error appears in the above-identified patent and that said Letters Patent is hereby corrected as shown below:

On the Title Page:

Correct item (73), Assignees, to read:

-- Hitachi Maxell, Ltd., Ibaraki-shi, Osaka (JP); Hitachi, Ltd., Tokyo (JP) --.

Signed and Sealed this  
Twelfth Day of April, 2011

David J. Kappos  
*Director of the United States Patent and Trademark Office*